(12) United States Patent
Mori

(10) Patent No.: US 11,149,600 B2
(45) Date of Patent: Oct. 19, 2021

(54) OIL LUBRICATION STRUCTURE OF TRANSMISSION DEVICE

(71) Applicant: Suzuki Motor Corporation, Hamamatsu (JP)

(72) Inventor: Masaki Mori, Hamamatsu (JP)

(73) Assignee: Suzuki Motor Corporation

( * ) Notice: Subject to any disclaimer, the term of this patent is extended or adjusted under 35 U.S.C. 154(b) by 618 days.

(21) Appl. No.: 16/164,391

(22) Filed: Oct. 18, 2018

(65) Prior Publication Data

US 2019/0120097 A1 Apr. 25, 2019

(30) Foreign Application Priority Data

Oct. 19, 2017 (JP) .............................. JP2017-202500

(51) Int. Cl.
*F01M 1/04* (2006.01)
*F01M 11/02* (2006.01)
*B62M 7/02* (2006.01)
*F16H 57/04* (2010.01)

(52) U.S. Cl.
CPC .............. *F01M 11/02* (2013.01); *B62M 7/02* (2013.01); *F16H 57/0424* (2013.01); *F16H 57/0465* (2013.01)

(58) Field of Classification Search
CPC ...... F16H 57/0423; F16H 3/089; F01M 11/02

USPC .......................................................... 184/6.5
See application file for complete search history.

(56) References Cited

U.S. PATENT DOCUMENTS

| | | | | |
|---|---|---|---|---|
| 5,839,531 A | * | 11/1998 | McGee ................. | F16N 31/006 180/69.1 |
| 7,513,172 B2 | * | 4/2009 | Takahashi ........... | F16H 57/0423 184/6.12 |
| 2011/0214947 A1 | * | 9/2011 | Tuomas .............. | F16H 57/0423 184/6.12 |
| 2015/0276041 A1 | * | 10/2015 | Tage ................... | F16H 57/0423 184/6.12 |

FOREIGN PATENT DOCUMENTS

JP 2015090146 A 5/2015

* cited by examiner

*Primary Examiner* — Long T Tran
*Assistant Examiner* — James J Kim
(74) *Attorney, Agent, or Firm* — Barnes & Thornburg LLP

(57) ABSTRACT

In the oil lubrication structure that supplies lubricating oil to the transmission device, the oil lubrication structure includes an oil passage formed above a transmission device. The oil passage is formed by an oil groove portion and a plate member. The oil groove portion is integrally formed in a crankcase. The plate member is arranged in the crankcase so as to cover the oil groove portion. The plate member has oil dripping holes formed therein, and the oil dripping holes are opened at positions directly above the transmission device.

8 Claims, 10 Drawing Sheets

OIL LUBRICATION STRUCTURE OF TRANSMISSION DEVICE

CROSS-REFERENCE TO RELATED APPLICATIONS

This application claims the benefit of priority of Japanese Patent Application No. 2017-202500, filed Oct. 19, 2017, the entire contents of which are incorporated herein by reference.

BACKGROUND OF THE INVENTION

Field of the Invention

The present invention relates to an oil lubrication structure of a transmission device that enables oil to be optimally supplied to gear mesh sections of the transmission device.

Description of the Related Art

In a motorcycle, a cylinder assembly that is tilted forward is arranged on an upper front part of a crankcase of an engine, and a balancer chamber is formed on an upper case of the crankcase and on a rear side of a cylinder block of the cylinder assembly. There is an oil lubrication structure of a transmission device in which an opening hole opening to an upper part of the transmission device is formed in a lower surface of a balancer chamber as an oil dripping hole (see Patent Document 1 (Japanese Patent Laid-Open No. 2015-90146)).

In the oil lubrication structure of the transmission device disclosed in Patent Document 1, positions of an oil supplying passage and an oil dropping hole formed in the lower surface of the balancer chamber depend on a shape of the balancer chamber housing a balance shaft. Therefore, it is difficult to arrange the oil supply passage and the oil dripping hole so as to match with gear mesh positions in gear stages of the transmission device.

SUMMARY OF THE INVENTION

The present invention has been made in the light of the abovementioned situation, and an object thereof is to provide an oil lubrication structure of a transmission device having a simple structure that enables oil to be optimally supplied to gear mesh positions in gear stages of the transmission device.

In order to solve the abovementioned problem, the present invention provides an oil lubrication structure of a transmission device provided in a vehicle, wherein the vehicle includes a crankcase, a constant-mesh-type transmission device provided in the crankcase, and the oil lubrication structure for supplying lubricating oil to the transmission device. The lubrication structure includes an oil passage formed above the transmission device. The oil passage includes an oil groove portion and a plate member. The oil groove portion is integrally formed in the crankcase. The plate member is arranged in the crankcase so as to cover the oil groove portion. The plate member has oil dripping holes formed therein, and the oil dripping holes are opened above gear mesh sections in gear stages of the transmission device.

Further, in order to solve the abovementioned problem, the present invention provides an oil lubrication structure of a transmission device, in which one shaft (counter shaft) of the transmission device close to a crankshaft rotates clockwise and another shaft (drive shaft) thereof rotates counter-clockwise in a left side view of an engine. Oil dripping holes that respectively supply lubricating oil from above gear mesh positions of drive gears and driven gears in stages of the transmission device are provided so as to be located behind a shaft center of the one shaft (counter shaft) of the transmission device and located in front of a shaft center of the other shaft (drive shaft) thereof in the left side view of the engine.

The oil lubrication structure of the transmission device according to the present invention can enable oil to be optimally supplied to the optimal gear mesh sections in the gear stages of the transmission device from the oil dripping holes with a simple structure.

The nature and further characteristic features of the present invention will be described hereinafter in the following descriptions made with reference to the accompanying drawings, and the other advantages effects and functions of the present invention will be also made clear hereinafter.

DETAILED DESCRIPTION

An embodiment of the present invention is described below with reference to the attached drawings.

Figure 1:
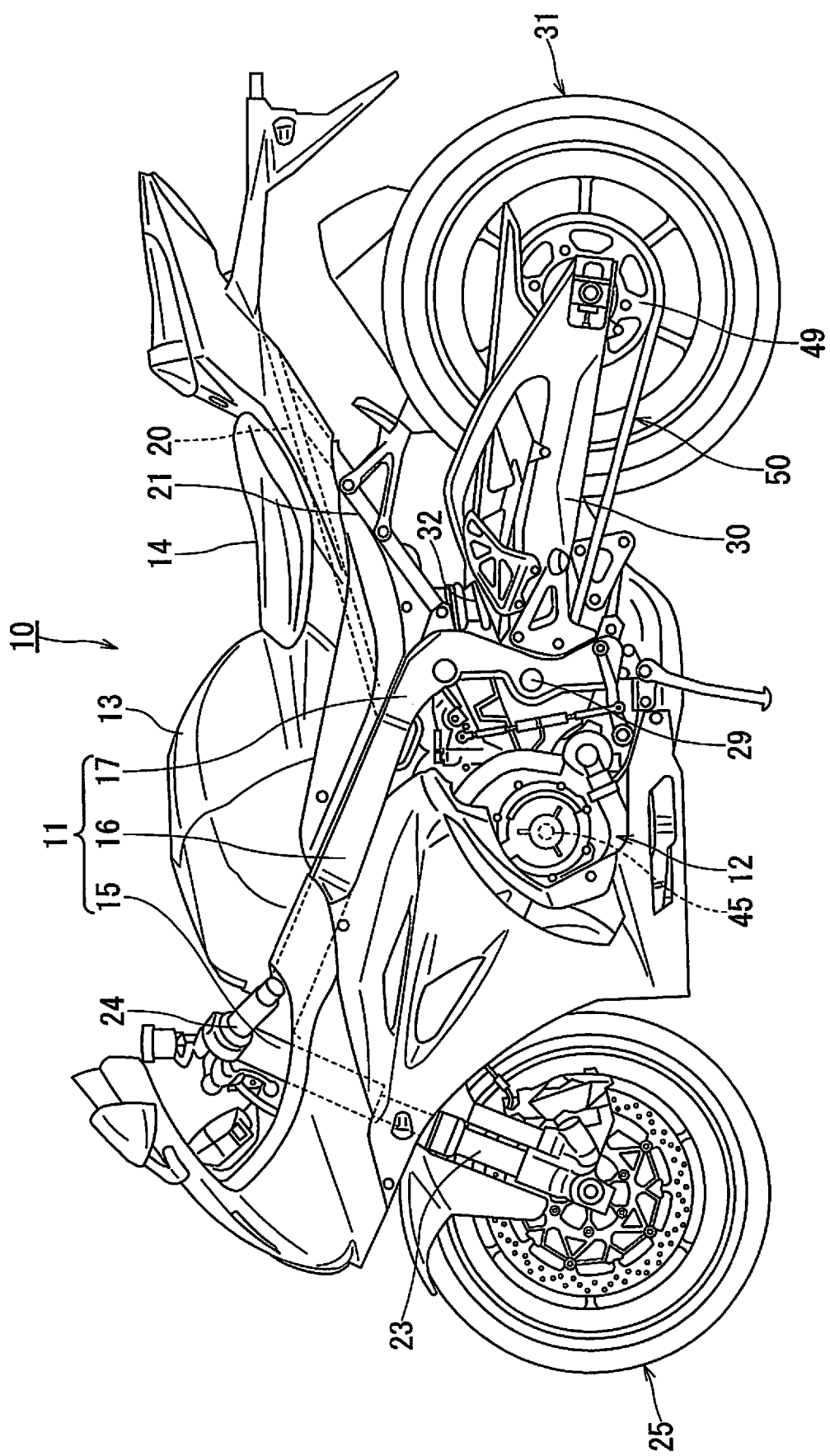
FIG. 1 is an entire side view of a motorcycle seen from a left side.
Figure 2:
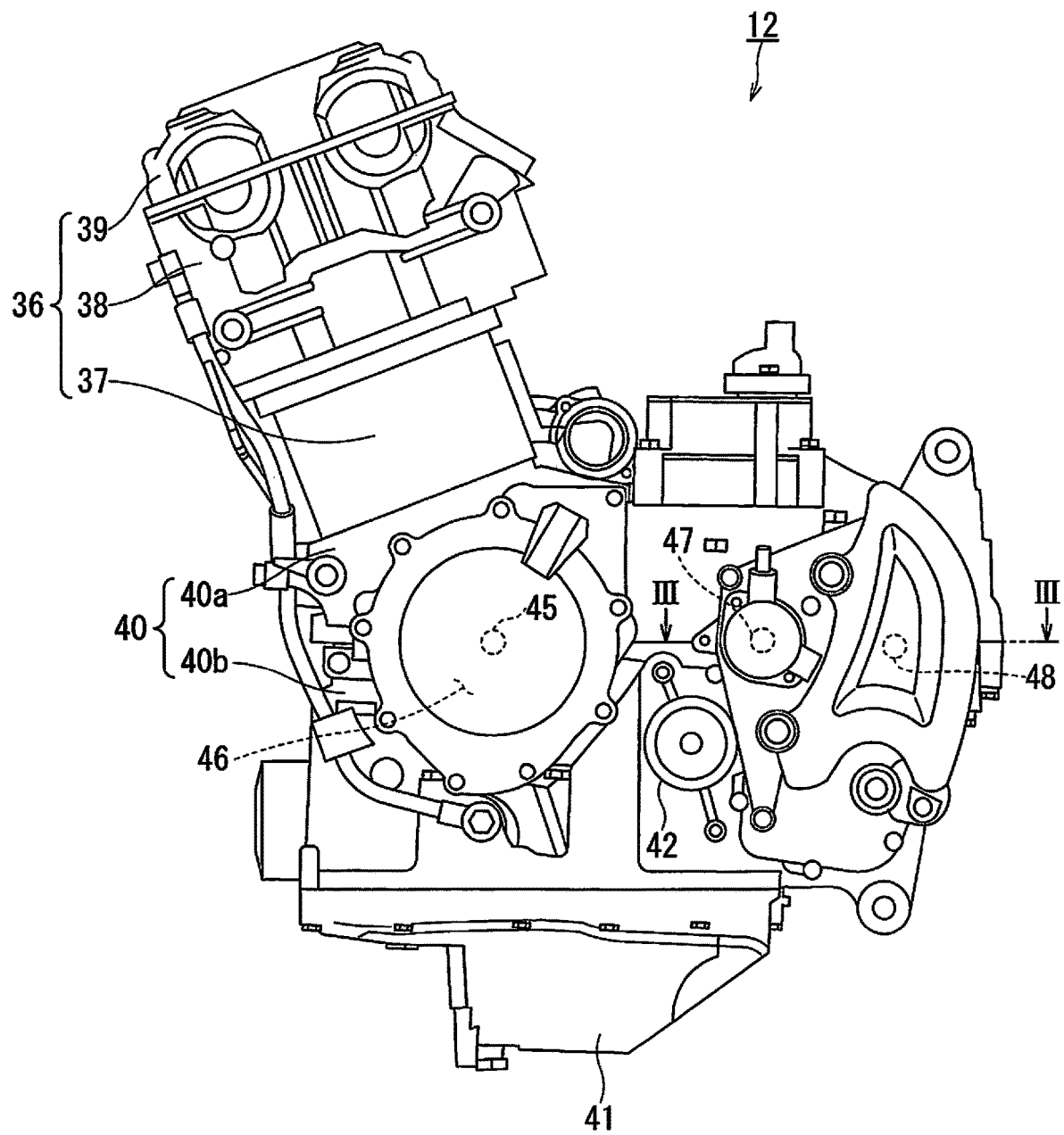
FIG. 2 is a left side view of an engine to be mounted on a vehicle body frame of the motorcycle.

FIG. 1 is a left side view illustrating an entire vehicle of a motorcycle including an oil lubrication structure of a transmission device according to the embodiment of the present invention, and FIG. 2 is a left side view of an engine to be mounted on a vehicle body frame of the motorcycle. In those drawings, front and back, left and right, and up and down refer to directions seen from a rider on the motorcycle.

In a motorcycle 10 serving as a small vehicle, an engine 12 is mounted on a cradle-type vehicle body frame 11. A fuel tank 13 is arranged above the engine 12, and a seat 14 on which the rider sits is arranged behind the fuel tank 13.

The vehicle body frame 11 includes a head tube 15, a pair of left and right main frames 16 extending backward from the head tube 15, and a pair of left and right center frames 17 that curve from a rear end portion of the main frames 16 so as to extend downward and forms a front portion frame.

Further, the vehicle body frame 11 includes a pair of left and right seat rails 20 extending backward and diagonally upward from an upper portion of a rear end of the main frames 16 or a top portion of the center frames 17, and a support frame 21 extending backward and upward from a middle of the center frames 17. A rear frame is formed by connecting a rear end portion of the seat rails 20 to a rear end portion of the support frame 21. The seat 14 is placed on the seat rails 20.

A front fork 23 is rotatably supported by the head tube 15. A steering handlebar 24 is arranged on an upper portion of the front fork 23, and a front wheel 25 is rotatably supported by a lower end of the front fork 23. The steering handlebar 24 is operated so as to be freely steered to the left and the right by the rider that has climbed onto the seat 14.

A pivot frame 29 is installed in the middle of the center frames 17 of the vehicle body frame 11 in a vehicle width direction. A swing arm 30 is supported by the pivot frame 29 so as to be swingable up and down. The swing arm 30 extends to a rear side of the vehicle, and a rear wheel 31 is supported by a rear end portion of the arm. Numeral 32 denotes a rear cushion device that elastically supports the swing arm 30.

The engine 12 mounted in a cradle space of the vehicle body frame 11 is a parallel four-cylinder engine as illustrated in FIG. 2, for example. In the engine 12, a cylinder assembly 36 that rises to the upper front when seen from the left side is arranged on an upper front portion of a crankcase 40 forming an engine case. The cylinder assembly 36 is tightly formed by sequentially assembling a cylinder block 37, a cylinder head 38, and a head cover 39.

The crankcase 40 is formed to have a box-like shape and is tightly formed by combining an upper crankcase (upper case) 40a and a lower crankcase (under case) 40b so as to be dividable into two. An oil pan 41 is arranged below the lower crankcase 40b, and lubricating oil is accumulated in the oil pan 41. The accumulated lubricating oil is supplied to lubrication portions of the vehicle described later by an oil pump 42.

A crankshaft 45 is arranged in a front side of the case in the crankcase 40 in the vehicle width direction, and a generator 46 and a piston-crank system and a drive side of a primary speed reduction mechanism (not shown) are attached to the crankshaft 45. A driven side of the primary speed reduction mechanism is attached to one shaft (counter shaft) 47 provided behind the crankshaft 45. The counter shaft 47 forms a main shaft, and another shaft (drive shaft) 48 is arranged behind the counter shaft 47 so as to be parallel to the vehicle width direction. The counter shaft 47 and the drive shaft 48 are arranged behind the crankcase 40 as illustrated in FIG. 2. A drive sprocket (not shown) is arranged on a left side of the drive shaft 48. The drive sprocket has a secondary speed reduction mechanism 50 such as a sprocket and chain mechanism is arranged between the drive sprocket and a driven sprocket 49 on the rear wheel 31 side, and the drive sprocket transmits a driving force to the rear wheel 31.

Figure 3:
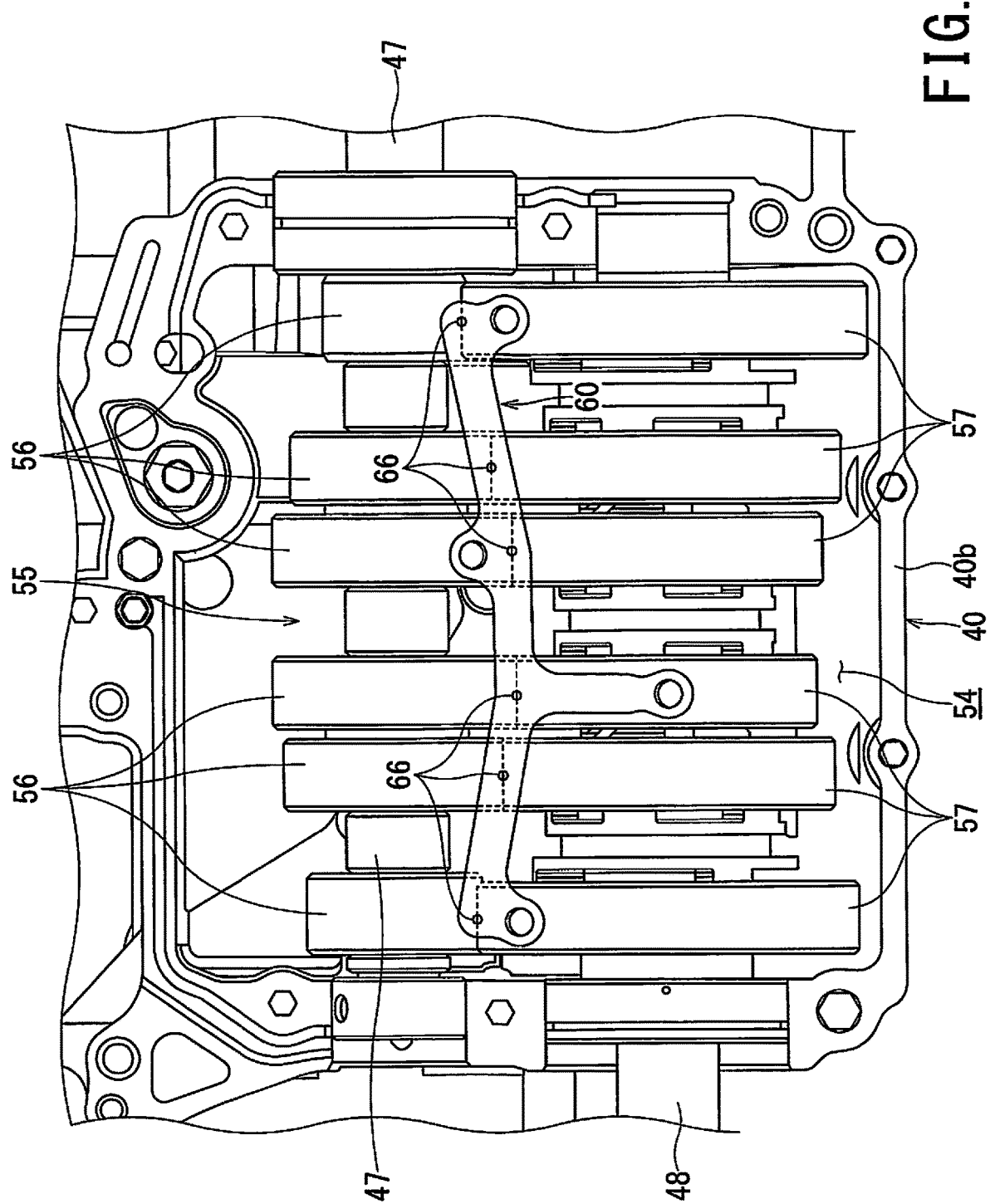
FIG. 3 is a plan view partially illustrating a crankcase taken along line III-III in FIG. 2.

FIG. 3 is a partial plan view taken along line III-III in FIG. 2. A transmission chamber 54 is arranged behind the crankcase 40, and a transmission device 55 is housed in the transmission chamber 54. The transmission device 55 forms a transmission and includes the counter shaft 47 that receives a rotating force from the crankshaft 45 that has passed through the primary speed reduction mechanism and a clutch mechanism (not shown), and the drive shaft 48 that passes the driving force to the rear wheel 31.

A plurality of pairs of drive gears 56 and driven gears 57 having different transmission gear ratios are combined and arranged on the counter shaft 47 and the drive shaft 48 of the transmission device 55 so as to be in constant mesh. A four-speed to six-speed gear mesh structure is employed in the transmission device 55 of the motorcycle 10. FIG. 3 illustrates an example including the six-speed transmission device 55. In the transmission device 55, six drive gears 56 and six driven gears 57 are attached to the counter shaft 47 and the drive shaft 48.

In the constant-mesh-type transmission device 55, the drive gears 56 on the counter shaft 47 and the driven gears 57 on the drive shaft 48 constantly mesh with each other, and the drive gears 56 and the driven gears 57 forming the number of speeds are configured so that the drive gears 56 are fixed on the shaft and the driven gears 57 are free and can run idle on the shaft.

As described above, the transmission device 55 is formed by combining the drive gears 56 and the driven gears 57 having different gear transmission gear ratios, and hence gear mesh portions in the stages are not disposed in a horizontal straight line but are disposed to be curved in a curve-like shape having a curvature as indicated by broken lines in a planar view in FIG. 3. In the transmission device 55, a plate member 60 is arranged directly above the gear mesh portions in a removable manner.

Figure 4:
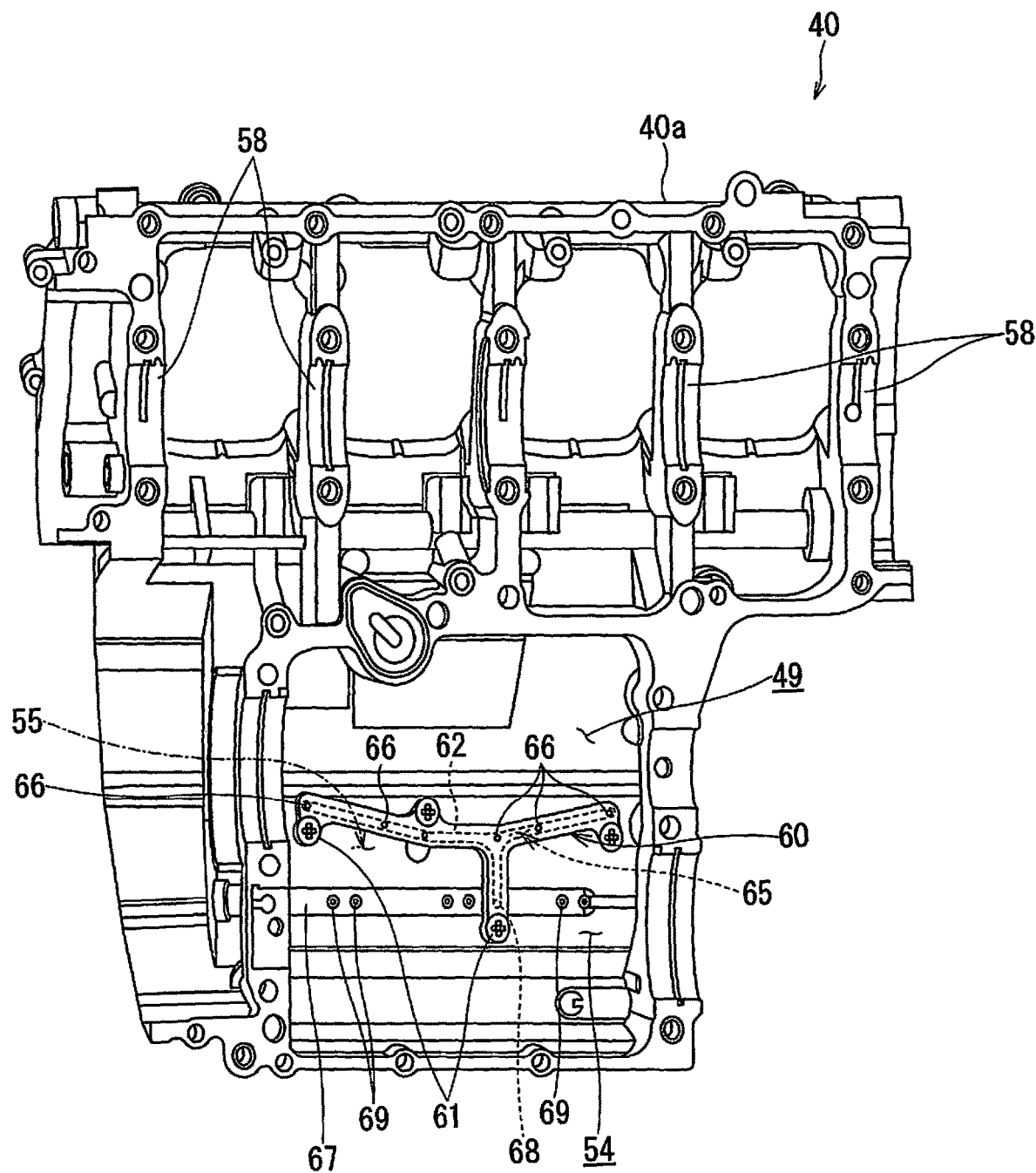
FIG. 4 is a top view of an inner surface of an upper crankcase seen from below from a case opening side below the upper crankcase.

FIG. 4 is a top view of the upper crankcase (upper case) 40a of the crankcase 40 seen from below from the case opening side. The plate member 60 is attached to a back side of the upper crankcase 40a by fastenings 61 such as bolts and screws. The plate member 60 is attached so as to close an opening portion of an oil groove portion 62 molded in an upper back side wall surface of the upper crankcase 40a. By closing the oil groove portion 62 by the plate member 60 from a groove opening side, an oil passage 65 is formed in the inside.

The oil passage 65 is included in a section of an upper inner wall surface of the upper crankcase 40a that is directly above the gear mesh portions (sections) of the transmission device 55.

Figure 5:
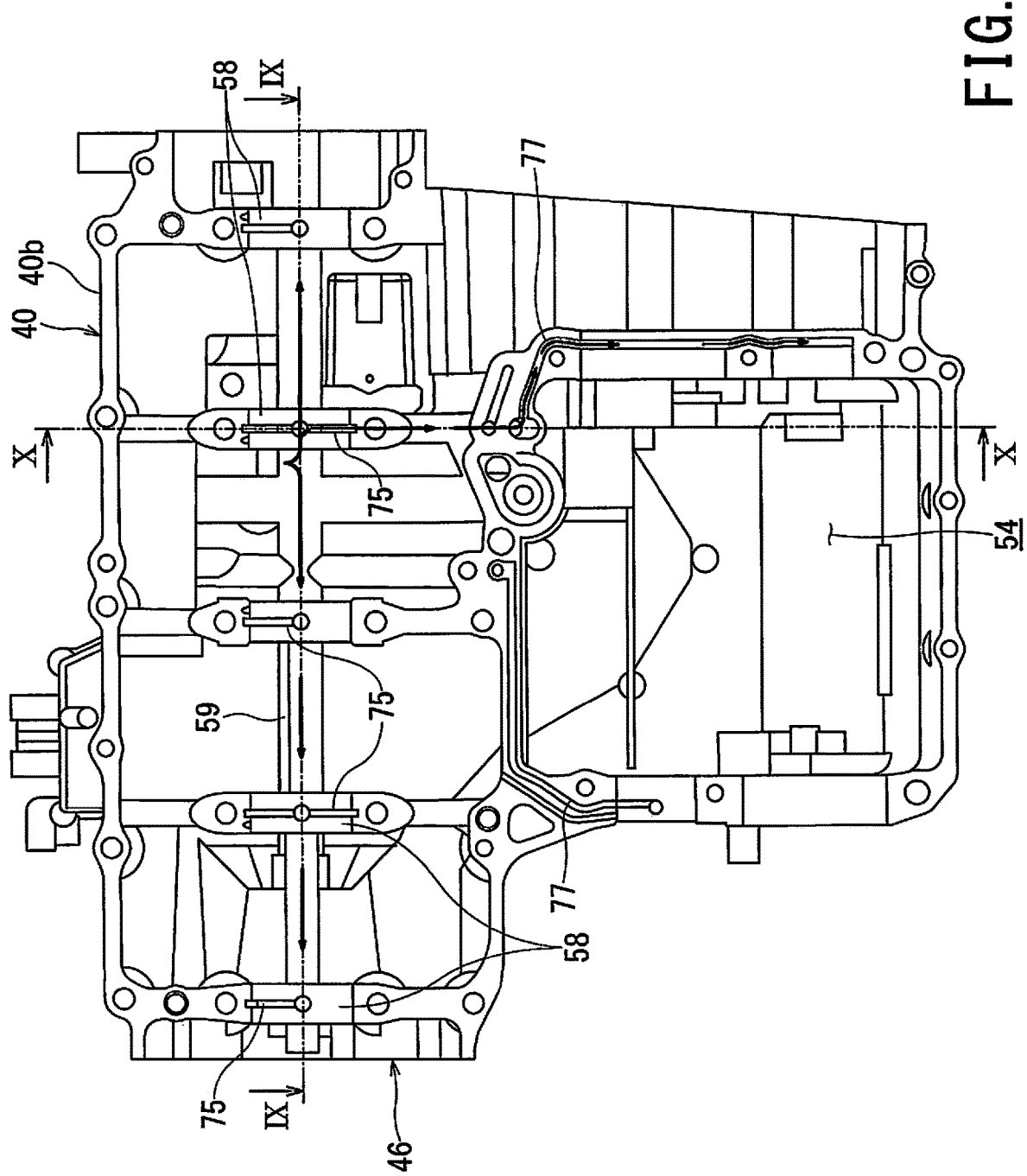
FIG. 5 is a plan view of an inner surface of a lower crankcase seen from the case opening side above the lower crankcase.

FIG. 4 is a top view of the upper crankcase 40a seen from below from the case opening portion side below the upper crankcase 40a, and FIG. 5 is a plan view illustrating the lower crankcase 40b from the case opening portion side above the lower crankcase 40b. The crankshaft 45 is arranged on a front side of the lower crankcase 40b in the vehicle width direction. The crankshaft 45 is rotatably supported by main journal portions 58 spaced from each other in the vehicle width direction. A main gallery 59 forming an oil passage is provided below the crankshaft 45. The crankcase 40 is tightly formed by stacking the upper crankcase 40a on the lower crankcase 40b, and the transmission chamber 54 is defined on a rear side of the crankcase 40.

In the upper crankcase 40a, the T-shaped oil groove portion 62 is integrally molded in the upper back side wall surface thereof through die molding and the like. The oil groove portion 62 is formed to have a shape of a recessed portion depressed upward. The oil groove portion 62 is fastened with the plate member 60 with use of a plurality of the fastenings 61 such as bolts and screws, and the plate member 60 closes the opening of the oil groove portion 62 from below. The oil passage 65 is formed in the inside by a structure in which the plate member 60 is fastened to the upper back side wall surface of the upper crankcase 40a by the fastenings 61. The plate member 60 forming the oil passage 65 can effectively prevent slip-off or damage due to the vibration of the engine by employing a structure in which fastening is performed by the fastenings 61. The oil groove portion 62 forming the oil passage 65 is molded through die molding. Therefore, the necessary process is easier than a case where an oil passage is formed in the crankcase 40 through drilling. As a result, the manufacturing cost can be reduced.

The plate member 60 that closes the oil groove portion 62 in the upper crankcase 40a is shaped as a flat plate and is removably attached by the fastenings 61. However, the plate member 60 may be tightly fixed by caulking and the like instead of using the fastenings 61. Fastening attaching positions of the plate member 60 are provided so as to avoid positions that overlap with the gear mesh sections in the stages of the transmission device 55 in a planar view of the crankcase 40 illustrated in FIG. 3. Oil dripping holes 66 are formed in the plate member 60 at positions directly above the gear mesh sections in the stages. The gear mesh sections of the drive gears 56 and the driven gears 57 in the stages of the transmission device 55 are not disposed in a horizontal straight line and are formed to be curved in a curve-like shape or a curvature-like shape in the vehicle width direction due to difference in the gear transmission gear ratio among the stages. Therefore, the oil dripping holes 66 in the plate member 60 are disposed so as to curve along the gear mesh sections in the stages in the vehicle width direction.

The oil passage 65 formed in the upper back side wall surface of the upper crankcase 40a communicates with an oil gallery 67 forming the oil passage for the transmission device via a groove portion communication hole 68 as illustrated in FIG. 4. The lubricating oil from the oil pump 42 that has passed through the main gallery 59, a second oil passage 77 described below, and the oil gallery 67 is supplied to the oil passage 65. The lubricating oil from the oil passage 65 is supplied directly from above the gear mesh sections in the stages of the transmission device 55 through the oil dripping holes 66. The oil gallery 67 supplies the lubricating oil to a shift fork 85 of the transmission device 55 through a plurality of oil supply holes 69.

As described above, the oil dripping holes 66 in the plate member 60 are formed to supply the lubricating oil directly from above the gear mesh sections in the stages of the transmission device 55. Hole diameters of the oil dripping holes 66 are sized such that the oil dripping hole 66 corresponding to the gear mesh section that is frequently used is larger than the oil dripping holes 66 corresponding to the gear mesh sections of other stage numbers. For example, in a vehicle on which a small-displacement (less than 400 cc) engine is mounted, a hole diameter of the oil dripping hole 66 corresponding to the gear mesh section of a top gear stage is set to be large. In a vehicle on which a large-displacement engine (400 cc or more) is mounted, hole diameters of the oil dripping holes 66 corresponding to the gear mesh sections of intermediate and high gear stages, for example, fourth-speed and fifth-speed gear stages are set to be large.

In a vehicle for off-road travelling, hole diameters of the oil dripping holes 66 corresponding to the gear mesh sections of low gear stages, for example, first-speed to third-speed gear stages are set to be larger than the oil dripping holes 66 for the gear mesh sections of other gear stages. Alternatively, a hole diameter of an oil dripping hole corresponding to the gear mesh section on a high gear stage side on which high load is applied may be set to be larger than hole diameters of other gear stages.

As described above, various sizes of the oil dripping holes 66 are selected and set in accordance with on-road and off-road vehicles and various models of vehicles.

Figure 6:
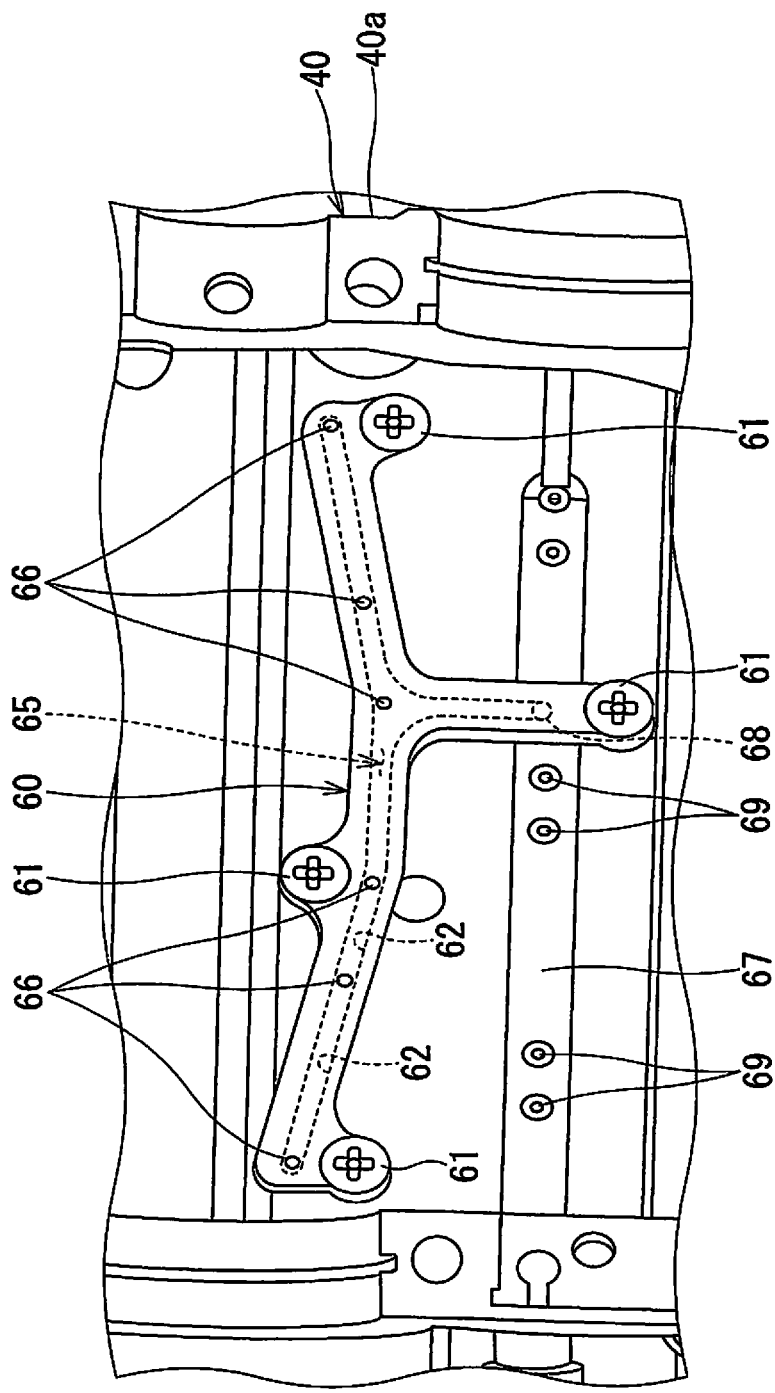
FIG. 6 is a mounting state view of a plate member illustrating an inner surface forming a transmission chamber of the upper crankcase.
Figure 7:
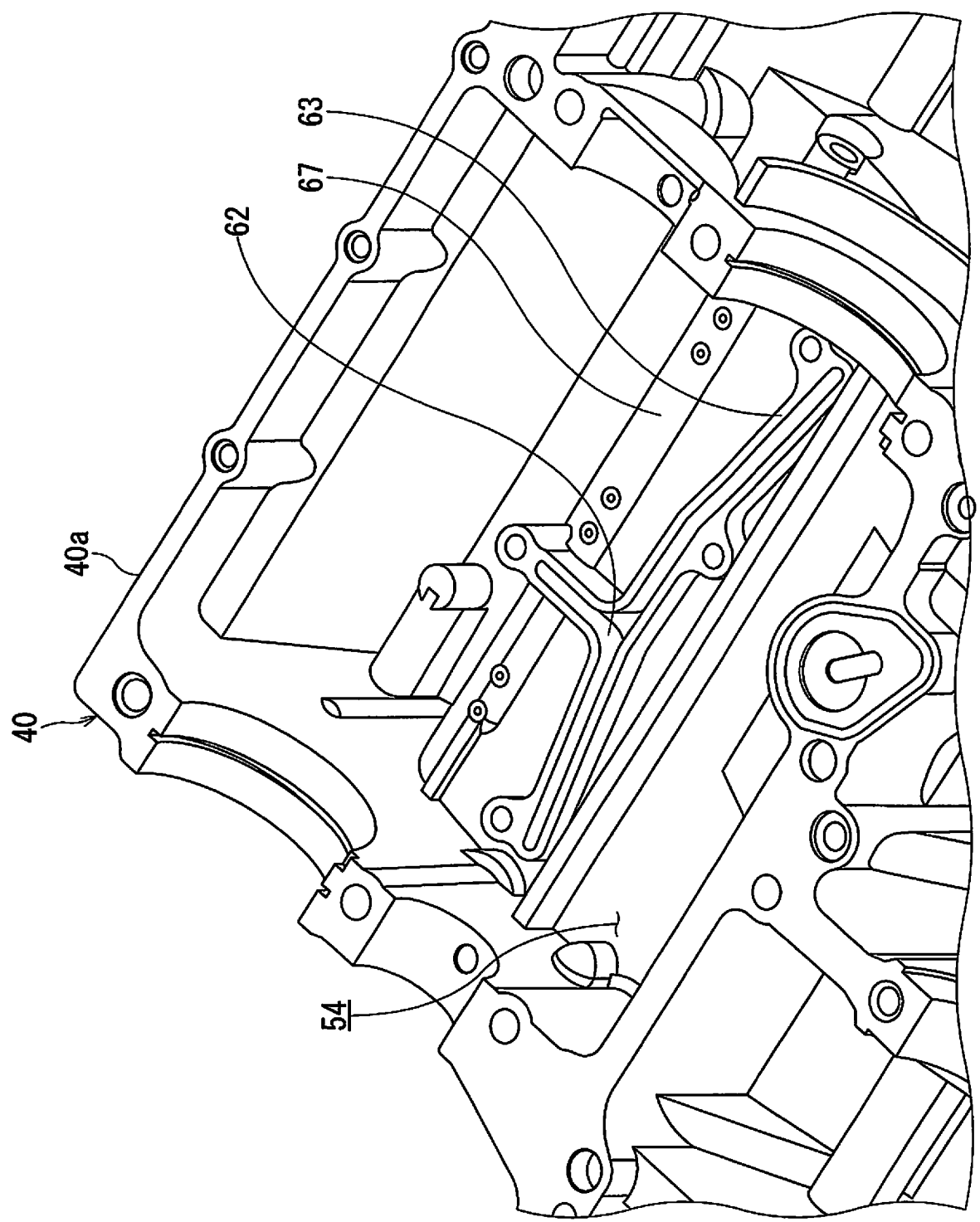
FIG. 7 is a view of the transmission chamber obliquely seen from below illustrating the inner surface of the upper crankcase in an enlarged manner.

In the example illustrated in FIG. 4 and FIG. 6, the oil groove portion 62 having a shape of a recessed portion is formed in the upper back side wall surface of the upper crankcase 40a, the oil passage 65 is formed by covering the opening of the oil groove portion 62 by the plate member 60 so as to close the opening, and the plate member 60 is tightly attached by the fastenings 61 such as bolts and screws. However, a configuration as illustrated in FIG. 7 may also be used. In FIG. 7, T-shaped wall-like projections 63 that project downward from the upper inner wall surface of the upper crankcase 40a may be die-molded, and the oil groove portion 64 may be formed between the wall-like projections 63. The plate member 60 and the oil groove portion 64 are not necessarily limited to have a T-shape, and may have other shapes, for example, an L-shape.

The lubricating oil is supplied to the gear mesh sections in the stages of the constant-mesh-type transmission device 55 from the oil dripping holes 66 in the plate member 60 located directly above the gear mesh sections. The transmission device 55 is arranged in the transmission chamber 54 on the rear side of the crankcase 40, and the plate member 60 is provided so as to be located behind a shaft center of the one shaft (the counter shaft 47) of the transmission device 55 and located in front of a shaft center of the other shaft (the drive shaft 48) thereof as illustrated in FIG. 3.

Out of the shafts of the transmission device 55, the one shaft (the counter shaft 47) close to the crankshaft 45 rotates clockwise and the other shaft (the drive shaft 48) rotates counterclockwise in a left side view of the engine 12. In the transmission device 55, the lubricating oil is supplied to the drive gears 56 and the driven gears 57 at the gear mesh sections in the stages from the oil dripping holes 66 in the plate member 60 above the gear mesh sections in the stages in a direction in which the gears are engaged. The lubricating oil is supplied directly from above the gear mesh sections in the stages of the transmission device 55 before the gear mesh in which the gears in the stages become engaged with each other. Therefore, the scattering of the oil due to the rotation of the gears is suppressed, and efficient oil lubrication is enabled.

Figure 9:
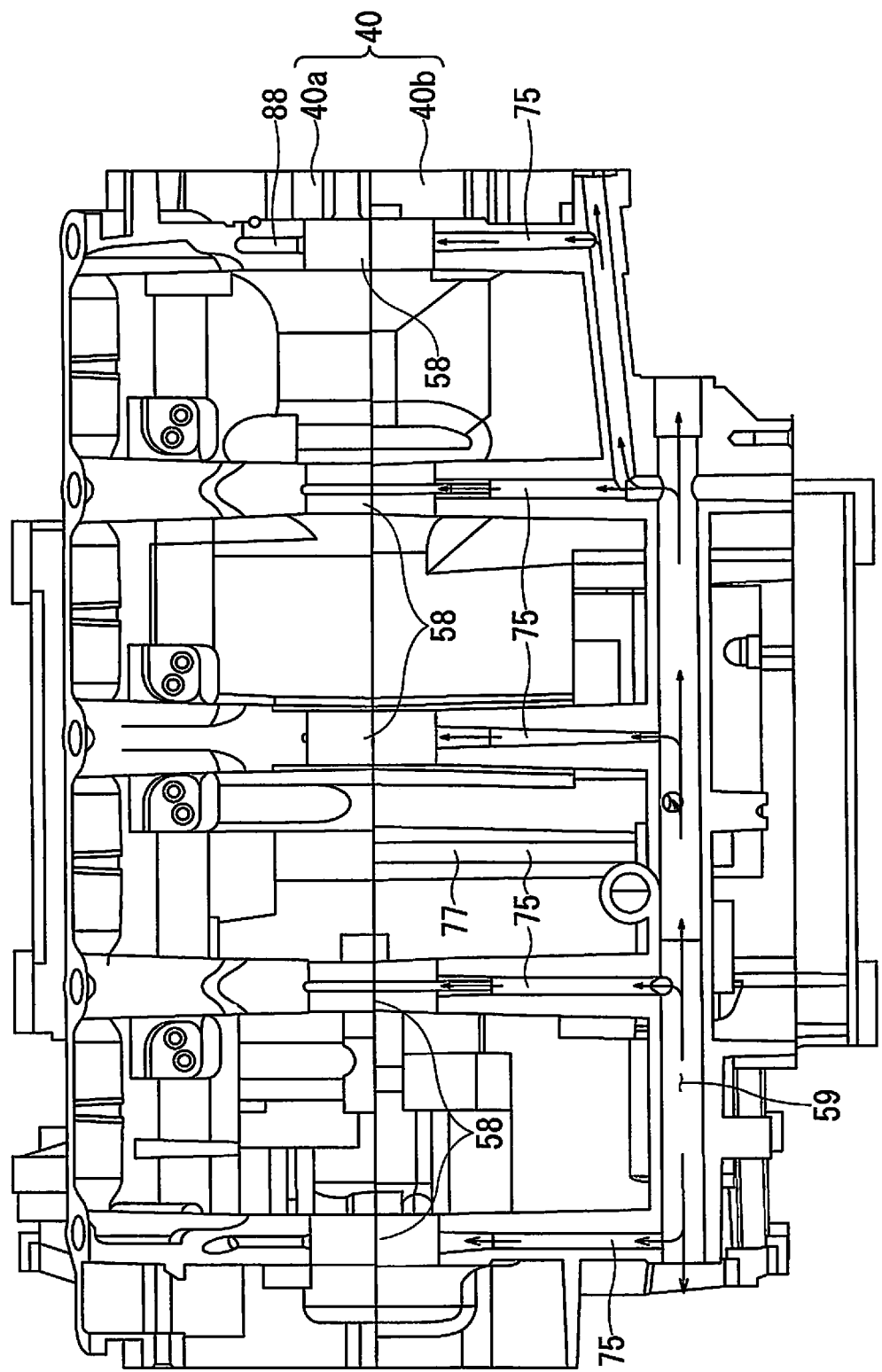
FIG. 9 is cross-sectional view in a vehicle width direction taken along line IX-IX in FIG. 5.
Figure 10:
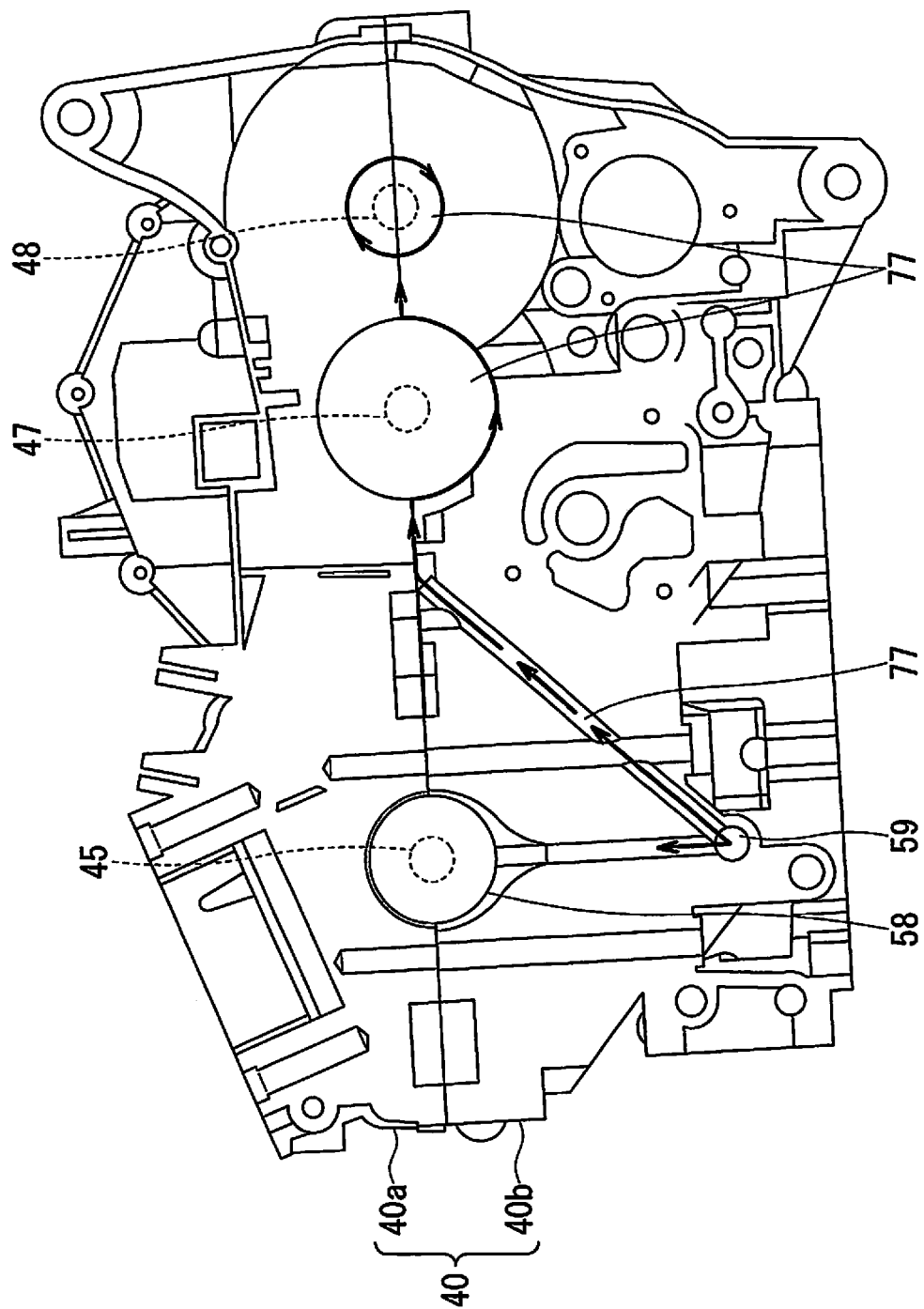
FIG. 10 is a cross-sectional side view taken along line X-X in FIG. 5.

Next, a lubrication path of the motorcycle is described with reference to FIG. 8 to FIG. 10.

Figure 8:
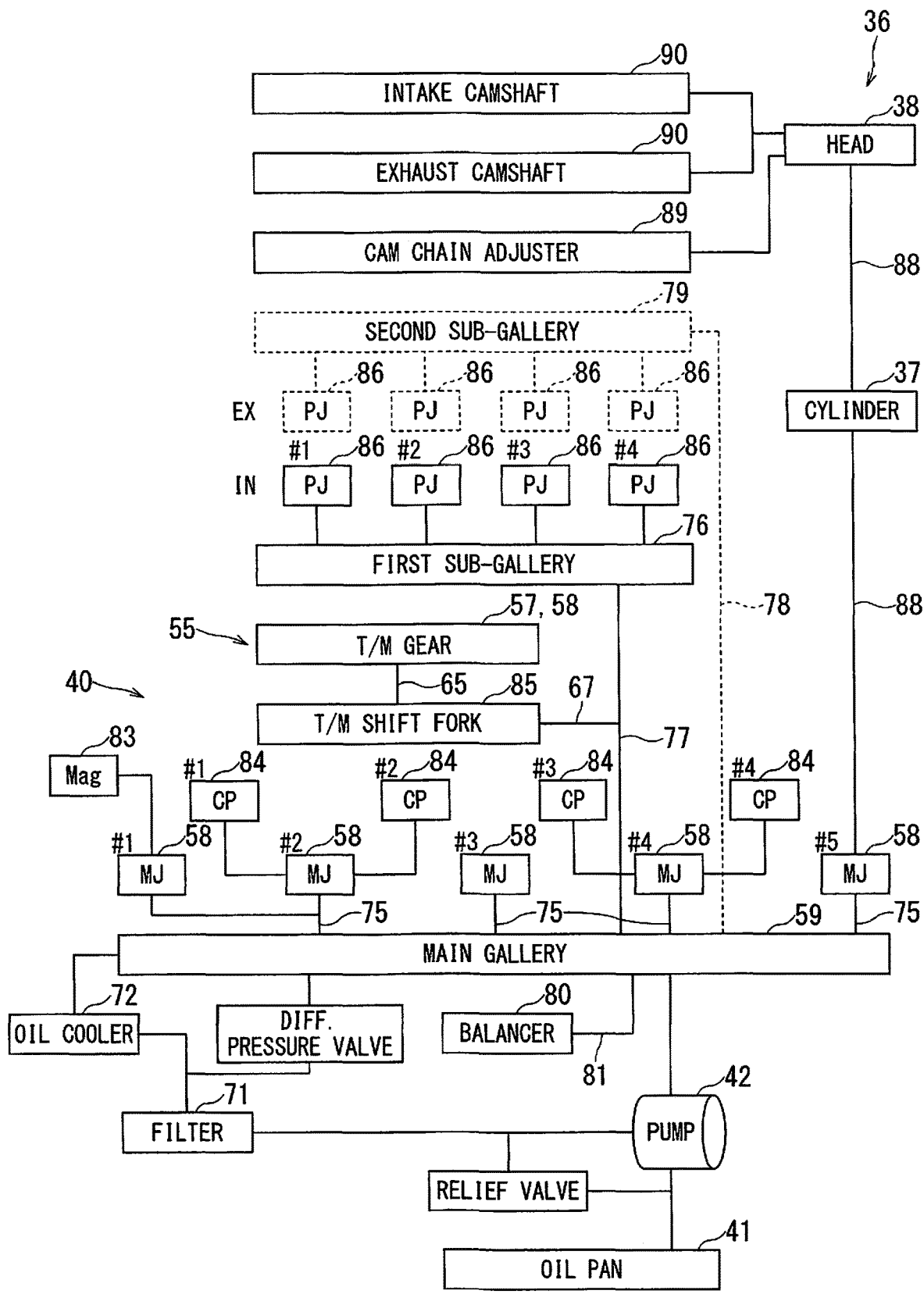
FIG. 8 is a simplified system diagram illustrating an oil lubrication passage through which lubricating oil flows.

FIG. 8 is a system diagram illustrating a lubrication path 70 that supplies the lubricating oil to the lubrication portions of the motorcycle 10 in a simplified manner. FIG. 9 is a cross-sectional view of the crankcase 40 of the engine 12 in the vehicle width direction taken along line IX-IX in FIG. 5, and FIG. 10 a cross-sectional right side view of the crankcase 40 taken along line X-X in FIG. 5.

In the motorcycle 10, the lubricating oil in the oil pan 41 is directly supplied to the main gallery 59 or is sent to the main gallery 59 from a filter 71 via an oil cooler 72 by the driving of the oil pump 42 in association with the driving of the engine 12. The main gallery 59 branches off into first oil passages 75 that supply the lubricating oil to No. 1 to No. 5 of the main journal portions 58, the second oil passage 77 that supplies the lubricating oil to the transmission device 55 and a first sub-gallery 76, a third oil passage 78 that supplies the lubricating oil to a second sub-gallery 79, a fourth oil passage 81 that supplies the lubricating oil to a balancer 80, and the like.

The lubricating oil sent to No. 1 of the main journal portions 58 from the first oil passage 75 lubricates No. 1 of the main journal portions 58, and then is guided to a generator 83, thereby lubricating the generator 83. The lubricating oil sent to No. 2 to No. 4 of the main journal portions 58 from the first oil passages 75 disposed in the vehicle width direction lubricates those main journal portions 58, and then lubricates No. 1 to No. 4 of crankpins 84.

The lubricating oil sent to the transmission device 55 from the second oil passage 77 lubricates the shift fork 85 of the transmission device 55 and lubricates transmission gears (the drive gears 56 and the driven gears 57) in the stages of the transmission device 55. The lubricating oil sent to the first sub-gallery 76 lubricates No. 1 to No. 4 of piston jet portions 86 by being supplied to No. 1 to No. 4 of the piston jet portions 86 from inner sides thereof.

The lubricating oil guided to the second sub-gallery 79 from the third oil passage 78 lubricates No. 1 to No. 4 of the piston jet portions 86 from outer sides thereof.

The lubricating oil that has lubricated No. 5 of the main journal portions 58 through the first oil passages 75 is continuously supplied into the cylinder block 37 and the cylinder head 38 through a fifth oil passage 88 and performs oil lubrication. The lubricating oil that has lubricated the cylinder head 38 is sent to a cam chain adjuster 89 and a camshaft 90 and performs oil lubrication.

As described above, by driving the oil pump 42, the lubricating oil accumulated in the oil pan 41 is supplied to the lubrication portions such as the main journal portions 58 and the crankpins 84 of the crankshaft 45, the transmission gears (the drive gears 56 and the driven gears 57) of the transmission device 55, and the camshaft 90 of the cylinder block 37 and the cylinder head 38 via the main gallery 59, and lubricates the lubrication portions. The oil that has lubricated the lubrication portions flows down through the cylinder assembly 36 and the crankcase 40 due to the effect of gravity and is collected in the oil pan 41 on a bottom portion of the engine 12, and one cycle of a lubricating function ends.

Effect of Embodiment

The oil lubrication structure of this embodiment forms most part of the oil passage 65 to the transmission device 55 with use of the oil groove portion 62 integrally molded with the crankcase 40 (the upper crankcase 40a) and the separate plate member 60 that closes the oil groove portion 62. Therefore, the oil passage 65 can be easily molded by a simple structure even if the oil passage 65 is a curved passage.

Forming the oil dripping holes 66 in the separate plate member 60 enables the oil dripping holes 66 to be positioned and sized optimally, thereby enabling the manufacturing cost to be reduced.

For any other oil passages formed in the crankcase 40, they may be formed with an integrally molded oil groove portion and a separate plate member such that the entire oil passage is made by separate bodies in order to enhance strength and earthquake resistance of the passage.

By forming the oil passage 65 and the oil dripping holes 66 in accordance with the gear mesh positions in the stages of the transmission device 55, both gears (the drive gear 56 and the driven gear 57) in each stage can be simultaneously lubricated by oil, thereby enabling efficient oil lubrication.

Since the lubricating oil is supplied directly from above the gear mesh sections in the stages of the transmission device 55, the scattering of the oil before the meshing due to gear rotation of the drive gears 56 and the driven gears 57 in the stages is suppressed, thereby enabling efficient lubrication.

In the gear meshing between the drive gears 56 and the driven gears 57 in the stages of the transmission device 55, the transmission gear ratios in the stages are different from each other, but the oil dripping holes 66 that supply oil to the gear mesh sections in the stages can be sized so as to enable optimal oil supply in accordance with frequency in use of the gear mesh sections of the stages, usage modes for an on-road vehicle or an off-road vehicle, and the like. As a result, durability can be enhanced and mechanical loss can be reduced for the vehicle.

The upper case 40a and the under case 40b having a structure that is split into an upper portion and a lower portion is cited as the crankcase 40 of the engine 12, and the oil groove portion 62 is easily processed through die molding in the upper back side wall surface of the upper crankcase 40a opening to a lower side. Therefore, productivity is enhanced and the manufacturing cost can be reduced.

In the transmission device 55, the oil dripping holes 66 are disposed directly above the gear mesh positions of the drive gears 56 and the driven gears 57 in the stages. Therefore, the oil dripping holes 66 can supply the lubricating oil immediately before both gears rotating in an engaging direction are meshed with each other in the gear meshing between the drive gear 56 and the driven gear 57 in each stage, thereby enabling oil lubrication that is more efficient.

The embodiment of the present invention is presented as an example and is not intended to limit the scope of the invention. The embodiment can be implemented in various modes, and various kinds of omissions, replacements, and modifications can be made without departing from the gist of the invention. The embodiment and variations thereof are included in the scope and gist of the invention and are included in the scopes of the invention described in the claims and their equivalents.

What is claimed is:

1. An oil lubrication structure of a transmission device provided in a vehicle, wherein the vehicle includes a crankcase, a constant-mesh-type transmission device provided in the crankcase, and the oil lubrication structure for supplying lubricating oil to the transmission device, the oil lubrication structure comprising:
   an oil passage formed above the transmission device, wherein the oil passage includes an oil groove portion and a plate member,
   the oil groove portion is integrally formed in the crankcase,
   the plate member is arranged in the crankcase so as to cover the oil groove portion, and
   the plate member has oil dripping holes formed therein, the oil dripping holes being opened at positions directly above the transmission device.

2. The oil lubrication structure of the transmission device according to claim 1, wherein:
   the oil groove portion of the oil passage is formed so as to pass through positions directly above gear mesh sections in gear stages of the transmission device; and
   each oil dripping hole of the oil dripping holes are formed in the position directly above a corresponding gear mesh section in a corresponding gear stage of the transmission device.

3. The oil lubrication structure of the transmission device according to claim 1, wherein the each oil dripping hole of the oil dripping holes are formed to have different hole diameter in accordance with the corresponding gear stage of the transmission device directly below the each oil dripping hole.

4. The oil lubrication structure of the transmission device according to claim 2, wherein the each oil dripping hole of the oil dripping holes are formed to have different hole diameter in accordance with the corresponding gear stage of the transmission device directly below the each oil dripping hole.

5. The oil lubrication structure of the transmission device according to claim 1, wherein:
   the crankcase is formed to be dividable into an upper crankcase and a lower crankcase;
   the oil passage is formed in the upper crankcase; and
   the oil groove portion is formed in an upper inner wall surface of the upper crankcase, and has a recessed shape depressed upward.

6. The oil lubrication structure of the transmission device according to claim 2, wherein:
   the crankcase is formed to be dividable into an upper crankcase and a lower crankcase;
   the oil passage is formed in the upper crankcase; and
   the oil groove portion is formed in an upper inner wall surface of the upper crankcase, and has a recessed shape depressed upward.

7. The oil lubrication structure of the transmission device according to claim 3, wherein:
   the crankcase is formed to be dividable into an upper crankcase and a lower crankcase;
   the oil passage is formed in the upper crankcase; and
   the oil groove portion is formed in an upper inner wall surface of the upper crankcase, and has a recessed shape depressed upward.

8. The oil lubrication structure of the transmission device according to claim 4, wherein:
   the crankcase is formed to be dividable into an upper crankcase and a lower crankcase;
   the oil passage is formed in the upper crankcase; and
   the oil groove portion is formed in an upper inner wall surface of the upper crankcase, and has a recessed shape depressed upward.

\* \* \* \* \*